(12) United States Patent
Tetsuka

(10) Patent No.: US 8,800,389 B2
(45) Date of Patent: Aug. 12, 2014

(54) BICYCLE CRANK ARM WITH AN INPUT FORCE PROCESSING APPARATUS

(75) Inventor: Toshio Tetsuka, Ashiya (JP)

(73) Assignee: Shimano, Inc., Sakai (JP)

( * ) Notice: Subject to any disclaimer, the term of this patent is extended or adjusted under 35 U.S.C. 154(b) by 223 days.

(21) Appl. No.: 13/452,057

(22) Filed: Apr. 20, 2012

(65) Prior Publication Data
US 2013/0233126 A1    Sep. 12, 2013

Related U.S. Application Data

(63) Continuation-in-part of application No. 13/414,435, filed on Mar. 7, 2012.

(51) Int. Cl.
  *G01L 1/04* (2006.01)
  *G01L 1/22* (2006.01)
(52) U.S. Cl.
  USPC ........................................ 73/862.621; 73/862
(58) Field of Classification Search
  USPC ............................................. 73/862.621, 862
  See application file for complete search history.

(56) References Cited

U.S. PATENT DOCUMENTS

| | | | |
|---|---|---|---|
| 5,027,303 A * | 6/1991 | Witte | 702/44 |
| 7,174,277 B2 | 2/2007 | Vock et al. | |
| 7,806,006 B2 * | 10/2010 | Phillips et al. | 73/862.338 |
| 7,861,599 B2 * | 1/2011 | Meggiolan | 73/794 |
| 8,006,574 B2 * | 8/2011 | Meyer | 73/862.627 |
| 8,065,926 B2 * | 11/2011 | Meyer | 73/862.338 |
| 2005/0178210 A1 * | 8/2005 | Lanham | 73/818 |
| 2009/0120210 A1 * | 5/2009 | Phillips et al. | 73/862.338 |
| 2010/0263468 A1 * | 10/2010 | Fisher et al. | 74/469 |
| 2013/0233091 A1 * | 9/2013 | Tetsuka, Toshio | 73/862.621 |

* cited by examiner

*Primary Examiner* — Lisa Caputo
*Assistant Examiner* — Jamel Williams
(74) *Attorney, Agent, or Firm* — James A. Deland

(57) ABSTRACT

A bicycle crank arm comprises a first crank arm member having a first sensor-mounting surface and a second crank arm member having a second sensor-mounting surface. A first sensor is mounted to the first sensor-mounting surface, and a second sensor mounted to the second sensor-mounting surface.

22 Claims, 11 Drawing Sheets

BICYCLE CRANK ARM WITH AN INPUT FORCE PROCESSING APPARATUS

CROSS REFERENCE TO RELATED APPLICATIONS

This application is a continuation-in-part of U.S. patent application Ser. No. 13/414,435 filed Mar. 7, 2012 and titled "Bicycle Input Force Processing Apparatus."

BACKGROUND OF THE INVENTION

The present invention is directed to bicycles and, more particularly, to various features of a bicycle input force processing apparatus.

Some bicycle components have sensors attached to them to measure various operating characteristics of the component. For example, transmission shift control devices may have position sensors attached to the operating cable winding mechanism in order to sense the current operating position of the operating cable winding member. The position of the operating cable winding member provides information about the current gear ratio of the bicycle transmission, and that information may be communicated to the rider through a display. In another example, a magnet may be mounted to one of the spokes of the bicycle wheel, and a sensor such as a reed switch may be mounted to the bicycle frame so that the magnet passes by the sensor upon every revolution of the wheel. As a result, the sensor produces an electrical pulse every time the magnet passes by the sensor, and the time between successive pulses may be used to determine the speed of the bicycle. In yet another example, a force sensor such as a strain gauge may be mounted to the surface of a component such as a pedal crank or a wheel hub in order to measure torque being applied to the component. The information from the sensor then may be used to calculate the effort exerted by the rider.

SUMMARY OF THE INVENTION

The present invention is directed to various features of a bicycle input force measuring apparatus. In one embodiment, a bicycle crank arm comprises a first crank arm member having a first sensor-mounting surface and a second crank arm member having a second sensor-mounting surface. A first sensor is mounted to the first sensor-mounting surface, and a second sensor mounted to the second sensor-mounting surface. Additional inventive features will become apparent from the description below, and such features may be combined with the above features to provide additional benefits.

DETAILED DESCRIPTION OF THE EMBODIMENTS

Figure 1:
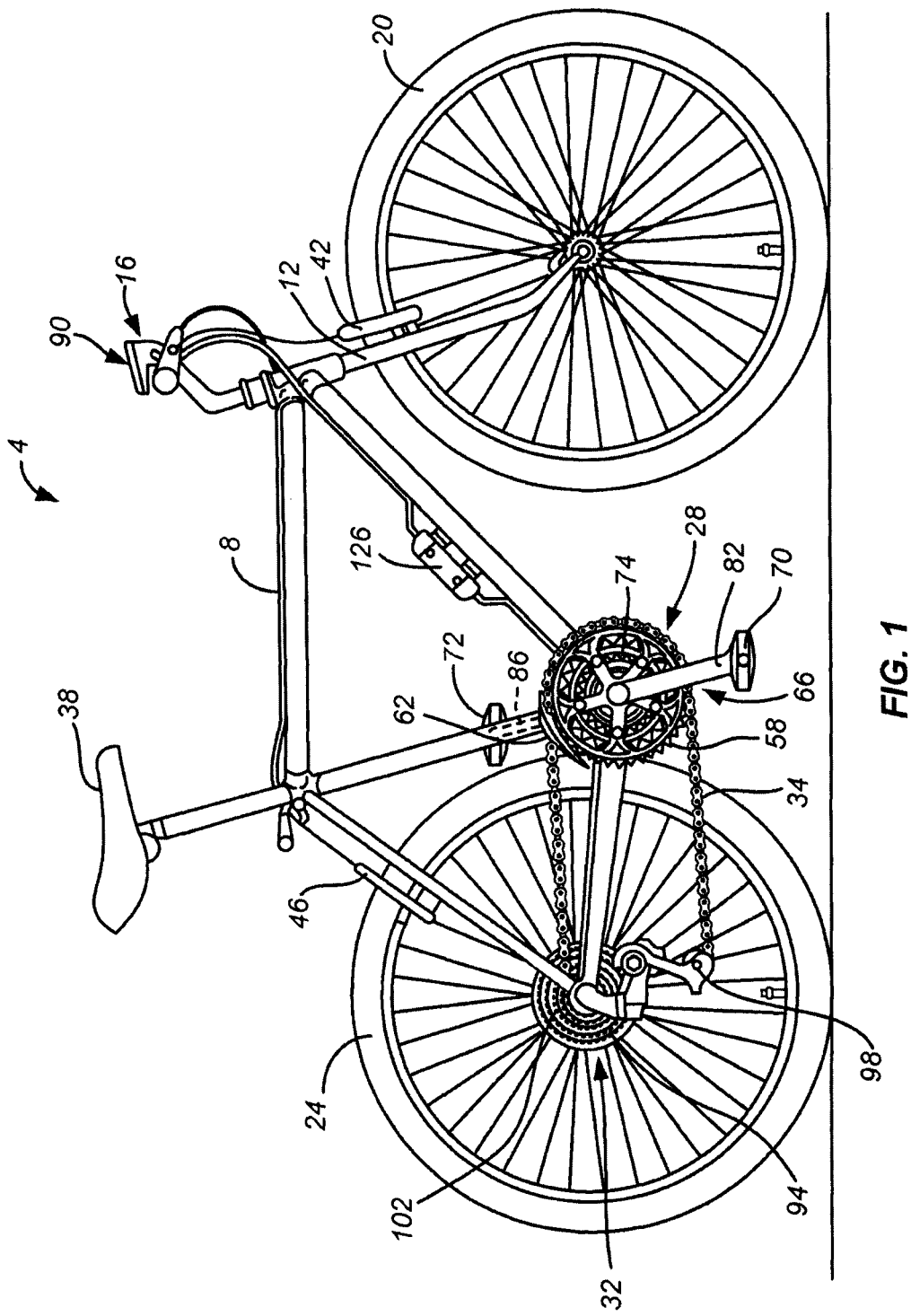
FIG. 1 is a side view of a bicycle that includes particular embodiments of electrically-controlled bicycle components.
Figure 2:
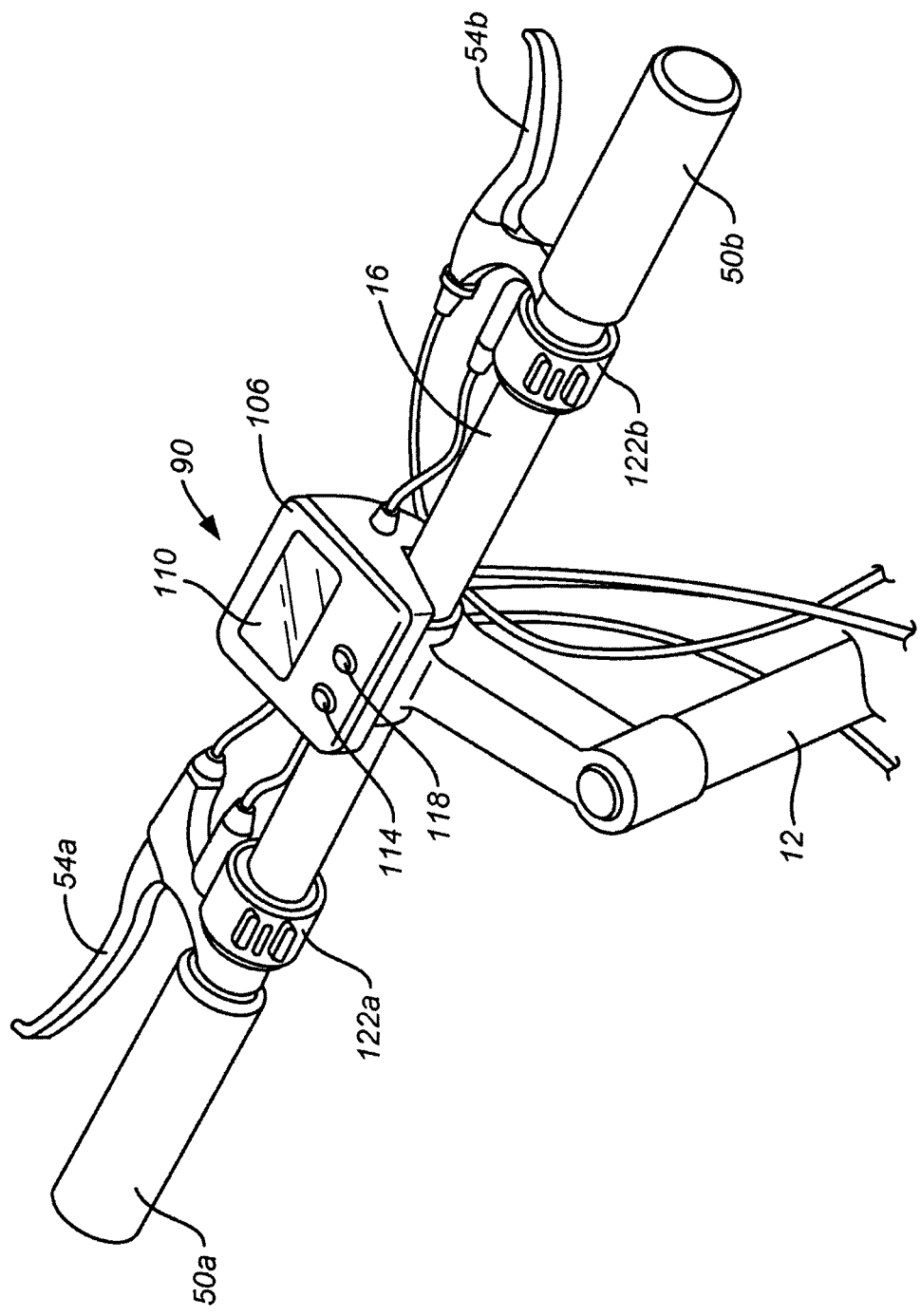
FIG. 2 is a detailed view of particular embodiments of handlebar-mounted components of the bicycle.

FIG. 1 is a side view of a bicycle 4 that includes particular embodiments of electrically-controlled components. Bicycle 4 is a sport bicycle such as a mountain bicycle, and it comprises a frame 8, a front fork 12 rotatably mounted to frame 8, a handlebar assembly 16 mounted to the upper part of fork 12, a front wheel 20 rotatably attached to the lower part of fork 12, a rear wheel 24 rotatably attached to the rear of frame 8, a front transmission 28, a rear transmission 32, a chain 34 operatively coupled to front transmission 28 and rear transmission 32, and a saddle 38. A front wheel brake 42 is provided for braking front wheel 20, and a rear wheel brake 46 is provided for braking rear wheel 24. As shown in FIG. 2, respective grips 50a, 50b and brake levers 54a, 54b are provided on both ends of handlebar assembly 16. Brake lever 54a is connected to front wheel brake 42 for braking front wheel 20, and brake lever 54b is connected to rear wheel brake 46 for braking rear wheel 24.

Front transmission 28 is a mechanical unit attached to the central lower part of frame 8 for transmitting drive force generated by the rider to rear transmission 32 via chain 34. Front transmission 28 comprises three sprockets 58 of various sizes and a front derailleur 62. The three sprockets 58 are installed on a gear crank 66 that is rotated when the rider pushes pedals 70 and 72. Gear crank 66 comprises a crank axle 74 that passes horizontally and rotatably through a bottom bracket of frame 8, a right crank arm 82, and a left crank arm 86. A first end portion of right crank arm 82 includes a crank axle mounting portion with an axle-mounting opening 82a (FIG. 3) for mounting right crank arm 82 to crank axle 74, and a second end portion of right crank arm 82 includes a pedal mounting portion with a pedal-mounting opening 82b for mounting pedal 70. Sprockets 58 are attached to right crank arm 82. A first end portion of left crank arm 86 includes a crank axle mounting portion with an axle-mounting opening 86a for mounting left crank arm 86 to crank axle 74, and a second end portion of left crank arm 86 includes pedal mounting portion with a pedal-mounting opening 86b for mounting pedal 72. Front derailleur 62 selectively engages chain 34 with one of the three sprockets 58 and can be moved by a motor (not shown) that is controlled by a control unit 90 mounted to handlebar assembly 16.

Rear transmission 32 transmits the driving force from chain 34 to rear wheel 24. Rear transmission 32 comprises a rear sprocket cluster 94 and a rear derailleur 98. Rear sprocket cluster 94 comprises a plurality of sprockets 102 mounted concentrically with the hub portion of rear wheel 24. Rear derailleur 98 engages chain 34 with selected ones of sprockets 102 and can be moved by a motor (not shown) that is controlled by control unit 90.

As shown in FIG. 2, control unit 90 includes a box-like housing 106. A display unit 110, a power switch 114, and a mode switch 118 are arranged on the upper surface of housing 106. Shift command units 122a, 122b are provided inwardly of grips 50a, 50b and brake levers 54a, 54b, respectively, and control unit 90 is operatively is connected to shift command units 122a, 122b. Shift command units 122a, 122b are used for shifting front transmission 28 and rear transmission 32, respectively. Control unit 90 is connected to front transmission 28 and to rear transmission 32 by a connector unit 126 (FIG. 1).

Figure 3:
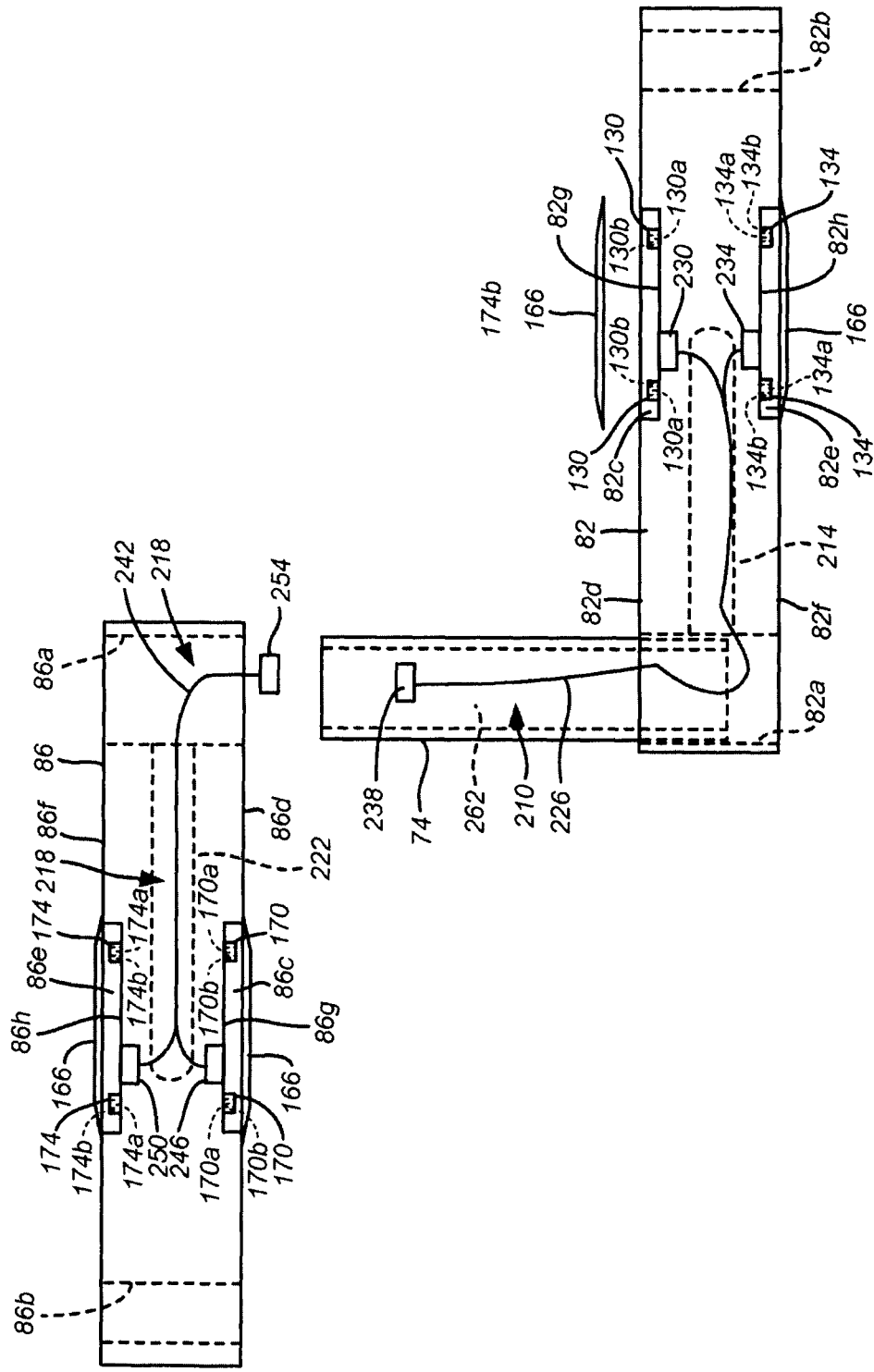
FIG. 3 is a schematic view of particular embodiments of crank arms and a crank axle of the bicycle.

As shown in FIG. 3, in this embodiment an inner space in the form of a first circuit-mounting opening 82c is formed at a laterally inner side surface 82d of crank arm 82, and an inner space in the form of a second circuit-mounting opening 82e is formed at a laterally outer side surface 82f of crank arm 82. First circuit-mounting opening 82c and second circuit-mounting opening 82e include respective bottom floors 82g and 82h so that first circuit-mounting opening 82c and second circuit-mounting opening 82e are formed as recesses in laterally inner side surface 82d and laterally outer side surface 82f, respectively.

As used herein, the inner side means the side of the crank arm that faces the bicycle frame when the crank arm is attached to the bicycle, the outer side means the side of the crank arm that faces away from the bicycle frame, the upper side means the side of the crank arm that faces upwardly when the crank arm is oriented generally horizontally with the outer side of the crank arm facing the viewer and the axle-mounting opening on the left, and the lower side means the side of the crank arm that faces downwardly when the crank arm is oriented generally horizontally with the outer side of the crank arm facing the viewer and the axle-mounting opening on the left.

First circuit-mounting structures 130 are disposed within first circuit-mounting opening 82c, and second circuit-mounting structures 134 are disposed within second circuit-mounting opening 82e. First and second circuit-mounting structures 130 and 134 are configured to detachably mount corresponding crank arm members such as circuit boards in the form of measurement boards 138 (FIGS. 4 and 5) to crank arm 82 at the respective first and second circuit-mounting openings 82c and 82e. First and second circuit-mounting structures 130 and 134 may be formed as continuous, one-piece structures with crank arm 82, or they may be separate structures welded to or otherwise bonded or fastened to crank arm 82. In this embodiment, first and second circuit-mounting structures 130 and 134 are structured as cylindrical pillars or some other forms of projections or protuberances. Preferably, but not necessarily, first and second circuit-mounting structures 130 and 134 may include further circuit-mounting openings 130a and 134a containing further circuit-mounting structures in the form of threads 130b and 134b. In other words, first circuit-mounting structures 130 and second circuit-mounting structures may be formed as threaded nuts.

Figure 5:
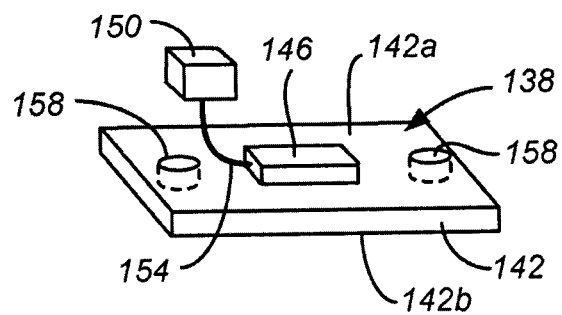
FIG. 5 is a perspective view of a particular embodiment of a measurement board.

As shown in FIG. 5, measurement board 138 may comprise a substrate 142 having a top surface 142a and a bottom surface 142b, a sensor 146 disposed at top surface 142a for measuring an input force, an electrical connector 150 electrically connected to sensor 146 through wiring 154, and mounting openings 158 in the form of through holes. Substrate 142 may be a printed circuit board or a semiconductor, metal or other conductive or nonconductive rigid or flexible sheet. In this embodiment, sensor 146 comprises a strain gauge (e.g., a plurality of resistors configured as a Wheatstone bridge) that may be affixed to substrate 142 or formed as part of substrate 142. Sensor 146 may be formed at least in part from a semiconductor material to detect the strain on substrate 142. Of course, other configurations of sensor 146 and substrate 142 will be readily understood depending upon the material used.

Figure 4:
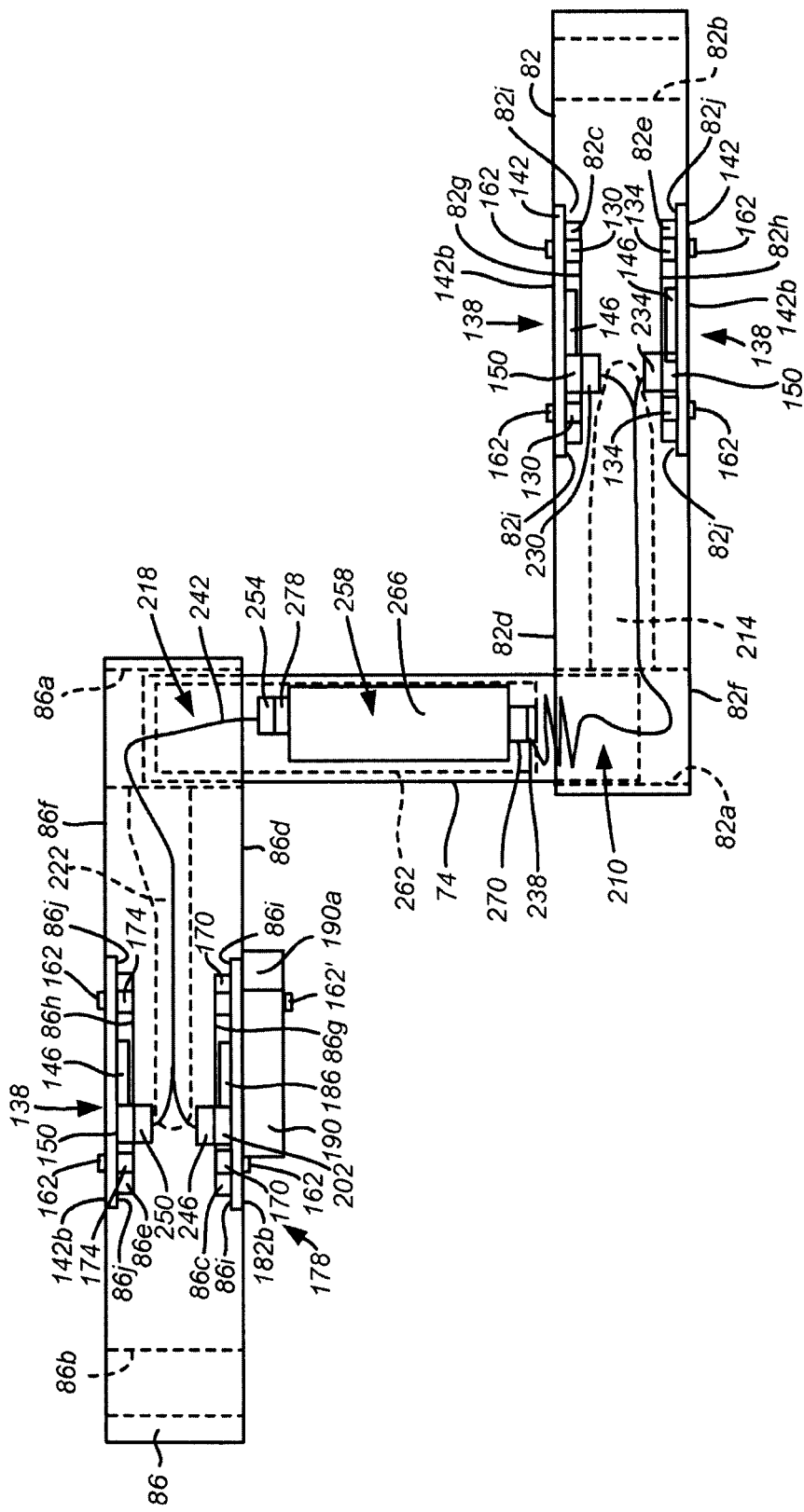
FIG. 4 is a schematic view of particular embodiments of measurement boards and a power source mounted to the crank arms and to the crank axle, respectively.

As shown in FIG. 4, each measurement board 138 may be detachably mounted to its corresponding first or second circuit-mounting structures 130 or 134 using threaded fasteners such as screws 162 that extend through mounting openings 158 in substrate 142 and into their corresponding first or second circuit-mounting structures 130 or 134. If desired, first and second circuit-mounting openings 82c and 82e may have stepped portions 82i and 82j that form an outline of a rectangle so that measurement boards 138 are disposed within their respective mounting openings 82c and 82e, and bottom surfaces 142b of measurement boards 138 are flush with their corresponding inner side surface 82d and outer side surface 82f of crank arm 82. As shown in FIG. 3, detachable covers 166 may cover first and second circuit-mounting openings 82c and 82e when a measurement board 138 is not mounted in a corresponding first or second circuit-mounting opening 82c or 82e. In this embodiment, mounting openings 82c and 82e may be sealed by their respective measurement boards 138.

As shown in FIG. 3, in this embodiment an inner space in the form of a first circuit-mounting opening 86c is formed at a laterally inner side surface 86d of crank arm 86, and an inner space in the form of a second circuit-mounting opening 86e is formed at a laterally outer side surface 86f of crank arm 86. First circuit-mounting opening 86c and second circuit-mounting opening 86e include respective bottom floors 86g and 86h so that first circuit-mounting opening 86c and second circuit-mounting opening 86e are formed as recesses in laterally inner side surface 86d and laterally outer side surface 86f, respectively. First circuit-mounting structures 170 are disposed within first circuit-mounting opening 86c, and second circuit-mounting structures 174 are disposed within second circuit-mounting opening 86e. First and second circuit-mounting structures 170 and 174 may be formed as continuous, one-piece structures with crank arm 86, or they may be separate structures welded to or otherwise bonded or fastened to crank arm 86. In this embodiment, as with first and second circuit-mounting structures 130 and 134 in crank arm 82, first and second circuit-mounting structures 170 and 174 are structured as cylindrical pillars or some other forms of projections or protuberances with further circuit-mounting openings 170a and 174a containing further circuit-mounting structures in the form of threads 170b and 174b.

Figure 6:
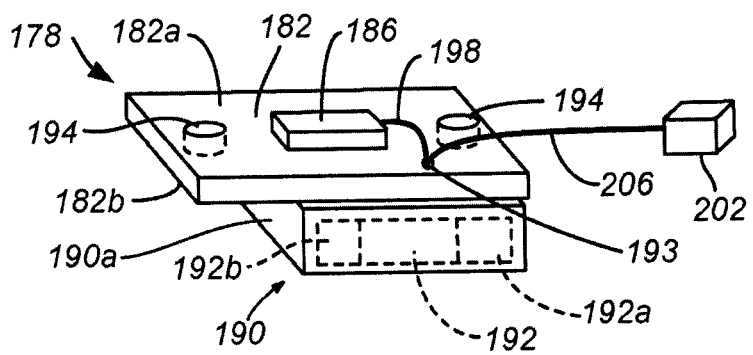
FIG. 6 is a perspective view of another embodiment of a measurement board with an attached control and communication circuit.

As shown in FIG. 4, first circuit-mounting structures 170 are configured to detachably mount a crank arm member such as a circuit board in the form of measurement board 178 (FIG. 6) to laterally inner side surface 86d of crank arm 86 at first circuit-mounting opening 86c, and second circuit-mounting structures 174 are configured to detachably mount a previously-described measurement board 138 to laterally outer side surface 86f of crank arm 86 at second circuit-mounting opening 86e. As shown in FIG. 6, measurement board 178 may comprise a substrate 182 having a top surface 182a and a bottom surface 182b, a sensor 186 disposed at top surface 182a for measuring an input force, a control and communication part 190 mounted to bottom surface 182b, and mounting openings 194 in the form of through holes. A similar through hole (not shown) that aligns with the right-side mounting opening 194 is disposed in control and communication part 190. Control and communication part 190 comprises a box housing 190a and control and communication circuitry 192 inside housing 190a. Housing 190a may be made of resin to facilitate the transmission of electromagnetic waves therethrough. Control and communication part 190 may be disposed on top surface 182a of substrate 182, in which case substrate 182 or crank arm 86 may be made of a non-metallic material, or control and communication part 190 may be disposed on bottom surface 182b of substrate 182.

As with measurement board 138, substrate 182 may be a printed circuit board or a semiconductor, metal or other conductive or nonconductive rigid or flexible sheet. Sensor 186 comprises a strain gauge (e.g., a plurality of resistors configured as a Wheatstone bridge) that may be affixed to substrate 182 or formed as part of substrate 182. Sensor 186 may be formed at least in part from a semiconductor material to detect the strain on substrate 182. Sensor 186 is operatively coupled to control and communication part 190 through wiring 198 that passes through a through-hole 193 in substrate 182, and an electrical connector 202 is electrically connected to control and communication part 190 through wiring 206 that passes through through-hole 193 in substrate 182.

Control and communication circuitry 192 may include a circuit board with a microprocessor programmed to calculate force or power applied to crank arms 82 and 86 in a well-known manner based on the signals received from sensors 146 and 186. Control and communication circuitry 192 also includes a transmitter 192a which may be a wired or a wireless transmitter that transmits sensor signals and/or calculated data wirelessly to control unit 90. A separate battery 190b may be disposed in housing 190 to power transmitter 192a, if desired.

As shown in FIG. 4, measurement board 178 may be detachably mounted to first circuit-mounting structures 170 using threaded fasteners such as screws 162 that extend through mounting openings 194 in substrate 182 (as well as through the aligned opening in control and communication part 190) and into first circuit-mounting structures 170, and measurement board 138 may be detachably mounted to second circuit-mounting structures 174 using threaded fasteners such as screws 162 that extend through mounting openings 158 in substrate 142 and into second circuit-mounting structures 174. If desired, first and second circuit-mounting openings 86c and 86e may have respective stepped portions 86i and 86j that form an outline of a rectangle so that measurement boards 178 and 138 are disposed within their respective mounting openings 86c and 86e, and the bottom surfaces 182b and 142b of respective measurement boards 178 and 138 are flush with their corresponding inner side surface 86d and outer side surface 86f of crank arm 86. As shown in FIG. 3, detachable covers 166 may cover first and second circuit-mounting openings 86c and 86e when a measurement board 178 or 138 is not mounted at its corresponding first or second circuit-mounting opening 86c or 86e.

As shown in FIGS. 3 and 4, a first wiring harness 210 is disposed at least partially within a hollow chamber 214 in crank arm 82, and a second wiring harness 218 is disposed at least partially within a hollow chamber 222 in crank arm 86. First wiring harness 210 comprises a wiring bundle 226, a first electrical connector 230, a second electrical connector 234, and a third electrical connector 238. In this embodiment, first electrical connector 230 is rigidly mounted to bottom floor 82g of first circuit-mounting opening 82c so as to be exposed to first circuit-mounting opening 82c, and second electrical connector 234 is rigidly mounted to bottom floor 82h of second circuit-mounting opening 82e so as to be exposed to second circuit-mounting opening 82e. Electrical connector 150 of measurement board 138 at first circuit-mounting opening 82c is connected to first electrical connector 230, and electrical connector 150 of measurement board 138 at second circuit-mounting opening 82e is connected to second electrical connector 234. If desired, first electrical connector 230 and second electrical connector 234 may form first and second circuit-mounting structures alone or in combination with their respective first and second circuit-mounting structures 130 and 134, especially if one or both of the electrical connectors 150 are rigidly mounted to their corresponding substrates 142. Hollow chamber 214, first circuit-mounting opening 82c and second circuit-mounting opening 82e may be in fluid communication with each other (i.e., form a continuous opening).

Similarly, second wiring harness 218 comprises a wiring bundle 242, a first electrical connector 246, a second electrical connector 250, and a third electrical connector 254. In this embodiment, first electrical connector 246 is rigidly mounted to bottom floor 86g of first circuit-mounting opening 86c so as to be exposed to first circuit-mounting opening 86c, and second electrical connector 250 is rigidly mounted to bottom floor 86h of second circuit-mounting opening 86e so as to be exposed to second circuit-mounting opening 86e. Electrical connector 202 of measurement board 178 at first circuit-mounting opening 86c is connected to first electrical connector 246, and electrical connector 150 of measurement board 138 at second circuit-mounting opening 86e is connected to second electrical connector 250. If desired, first electrical connector 246 and second electrical connector 250 may form first and second circuit-mounting structures alone or in combination with their respective first and second circuit-mounting structures 170 and 174, especially if electrical connector 202 is rigidly mounted to its corresponding substrate 182 and/or if electrical connector 150 is rigidly mounted to its corresponding substrate 142. Hollow chamber 222, first circuit-mounting opening 86c and second circuit-mounting opening 86e may be in fluid communication with each other (i.e., form a continuous opening).

Figure 7:
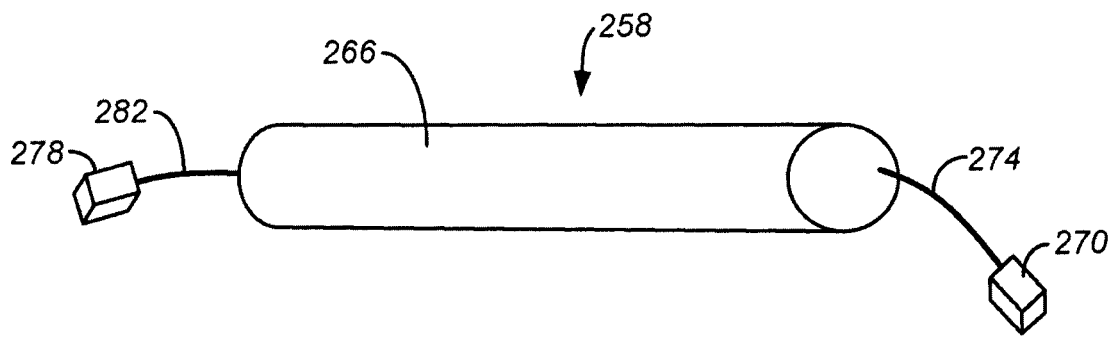
FIG. 7 is a perspective view of a particular embodiment of a power source.

As shown in FIGS. 4 and 7, a power source such as a battery unit 258 is disposed within a hollow chamber 262 in crank axle 74. Battery unit 258 comprises a cylindrical battery housing 266 that houses a plurality of individual battery cells (not shown), a first electrical connector 270 coupled to battery housing 266 through wiring 274, and a second electrical connector 278 coupled to battery housing 266 through wiring 282. First electrical connector 270 is connected to third electrical connector 238 of first wiring harness 210 for communicating operating power to measurement boards 138 at first and second circuit-mounting openings 82c and 82e of right crank 82 and for communicating sensor signals from sensors 146 on measurement boards 138 at first and second circuit-mounting openings 82c and 82e through bypass wiring (not shown) in battery housing 266. Second electrical connector 278 is connected to third electrical connector 254 of second wiring harness 218 for communicating operating power to measurement boards 178 and 138 at first and second circuit-mounting openings 86c and 86e of left crank 86 and for communicating sensor signals from sensors 146 on measurement boards 138 at first and second circuit-mounting openings 82c and 82e of right crank 82 to control and communication part 190. Wiring harness 218 also communicates sensor signals from sensor 146 on measurement board 138 at second circuit-mounting opening 86e of left crank 86 to control and communication part 190.

Figure 8:
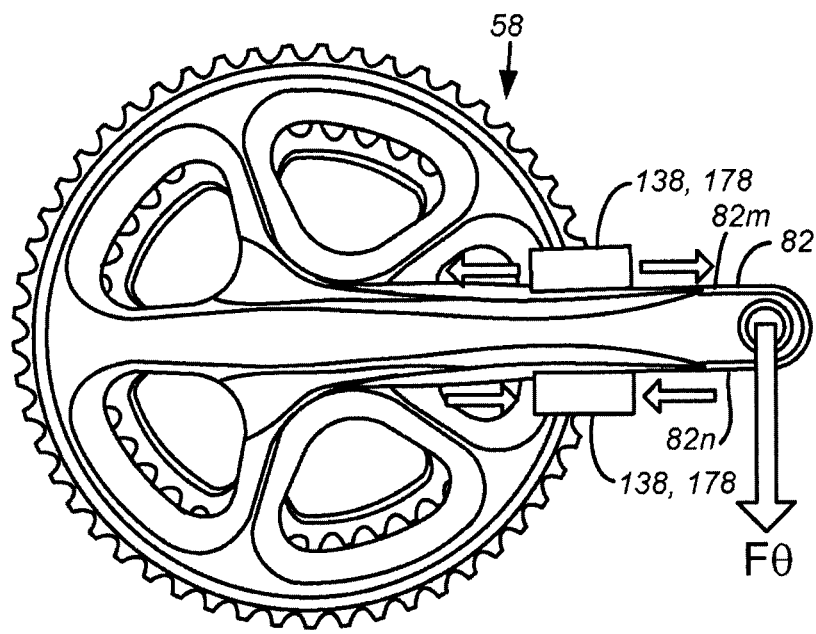
FIG. 8 is a schematic view of measurement board placement to measure a driving torque.
Figure 9:
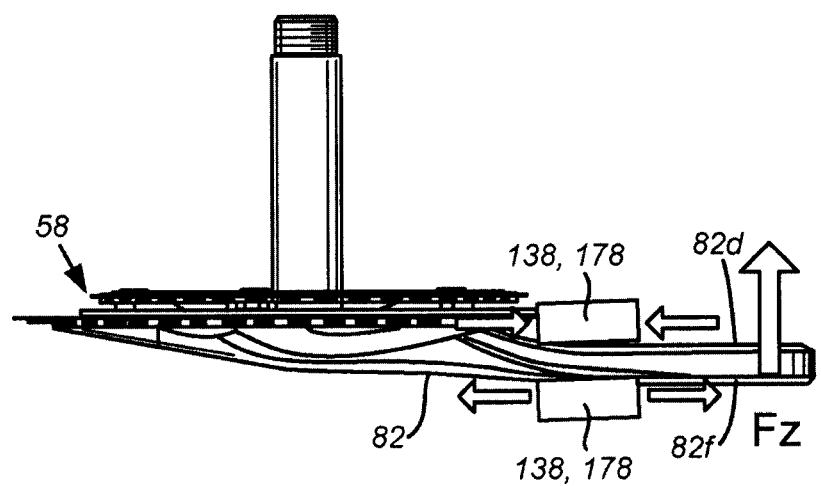
FIG. 9 is a schematic view of measurement board placement to measure an out-of-plane force.
Figure 10:
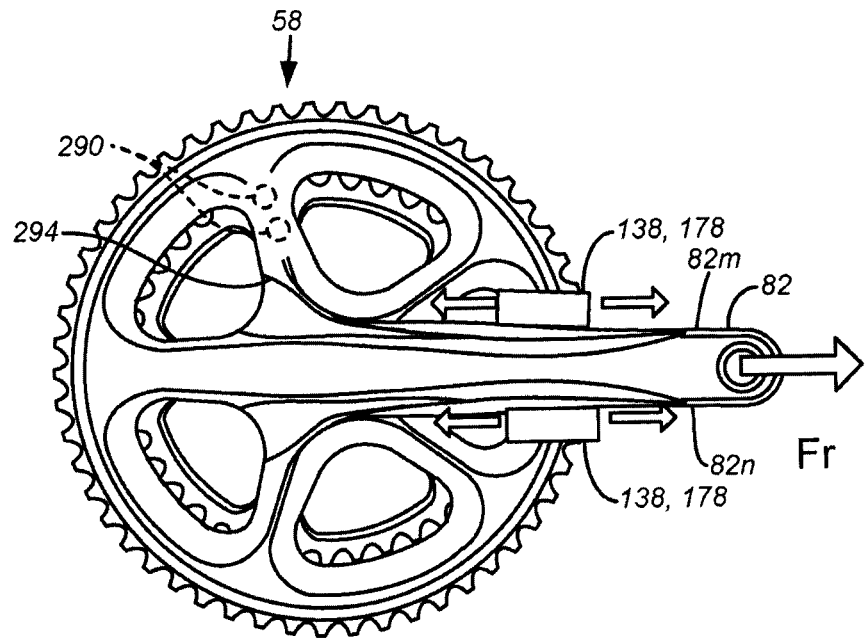
FIG. 10 is a schematic view of measurement board placement to measure a radial force.
Figure 11:
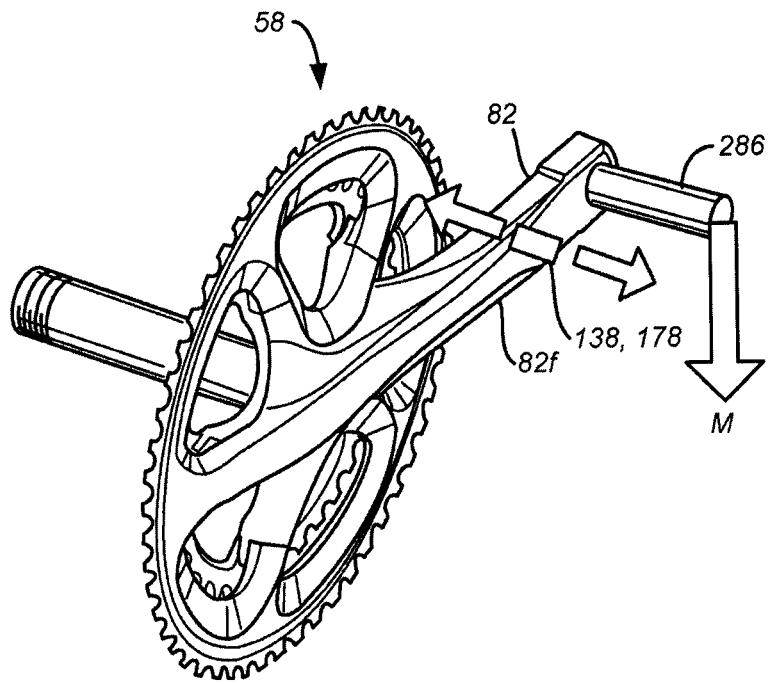
FIG. 11 is a schematic view of measurement board placement to measure a torsional moment force.

The sensor mounting arrangements disclosed herein have many uses. For example, as shown in FIG. 8, driving torque $F_\theta$ may be detected and processed by mounting measurement boards 138 (or 178) as shown on upper and lower side surfaces 82m, 82n of crank arm 82 so that the sensor mounted on upper side surface 82m detects tension (indicated by arrows) and the sensor mounted on the lower side surface 82n detects compression. As shown in FIG. 9, out-of-plane forces $F_z$ may be detected and processed by mounting measurement boards 138 (or 178) as shown on laterally inner and outer side surfaces 82d, 82f of crank arm 82 so that the sensor mounted on inner side surface 82d detects compression and the sensor mounted on the outer side surface 82f detects tension (or vice versa). As shown in FIG. 10, forces $F_r$ directed radially outwardly along the longitudinal axis of crank arm 82 may be detected and processed by mounting measurement boards 138 (or 178) as shown on upper and lower side surfaces 82m, 82n of crank arm 82 so that the sensor mounted on upper side surface 82m detects tension and the sensor mounted on the lower side surface 82n detects compression. As shown in FIG. 11, torsional moment forces M (caused by a pedal axle 286) may be detected and processed by mounting a measurement board 138 (or 178) diagonally as shown on laterally outer side surface 82f of crank arm 82 to detect diagonally-oriented tensile forces.

While the above is a description of various embodiments of inventive features, further modifications may be employed without departing from the spirit and scope of the present invention. For example, while first and second wiring harnesses 210 and 218 were disposed within hollow chambers 214 and 222 of crank arms 82 and 86, respectively, first and second wiring harnesses 210 and 218 could be molded directly into the corresponding first and second crank arms 82 or 86. Alternatively, first and second wiring harnesses 210 and 218 could be partially or entirely disposed outside of first and second crank arms 82 and 86, and connectors 150 and 202 need not be rigidly affixed to the bottom floors of their respective circuit-mounting openings. Likewise, battery unit 258 could be disposed partially or entirely outside of crank axle 78.

Circuit mounting openings 82c, 82e, 86c and 86e may be omitted, and measurement boards 138 and/or 178 may be mounted to circuit mounting structures such as protuberances, circuit mounting structures (e.g., threads) disposed in circuit mounting openings at the side of the crank arm, circuit mounting structures disposed at connectors mounted to the crank arm, etc. While measurement boards 138 and/or 178 were mounted to right crank 82 and/or left crank 86, measurement boards 138 and/or 178 may be mounted to any such circuit mounting structures 290 (FIG. 10), with or without corresponding recesses, disposed on a sprocket mounting arm (spider arm) 294 associated with right crank 82. While measurement boards 138 and 178 were illustrated with one sensor 146 and 186 each, measurement boards 138 and 178 may include multiple sensors each.

Figure 12:
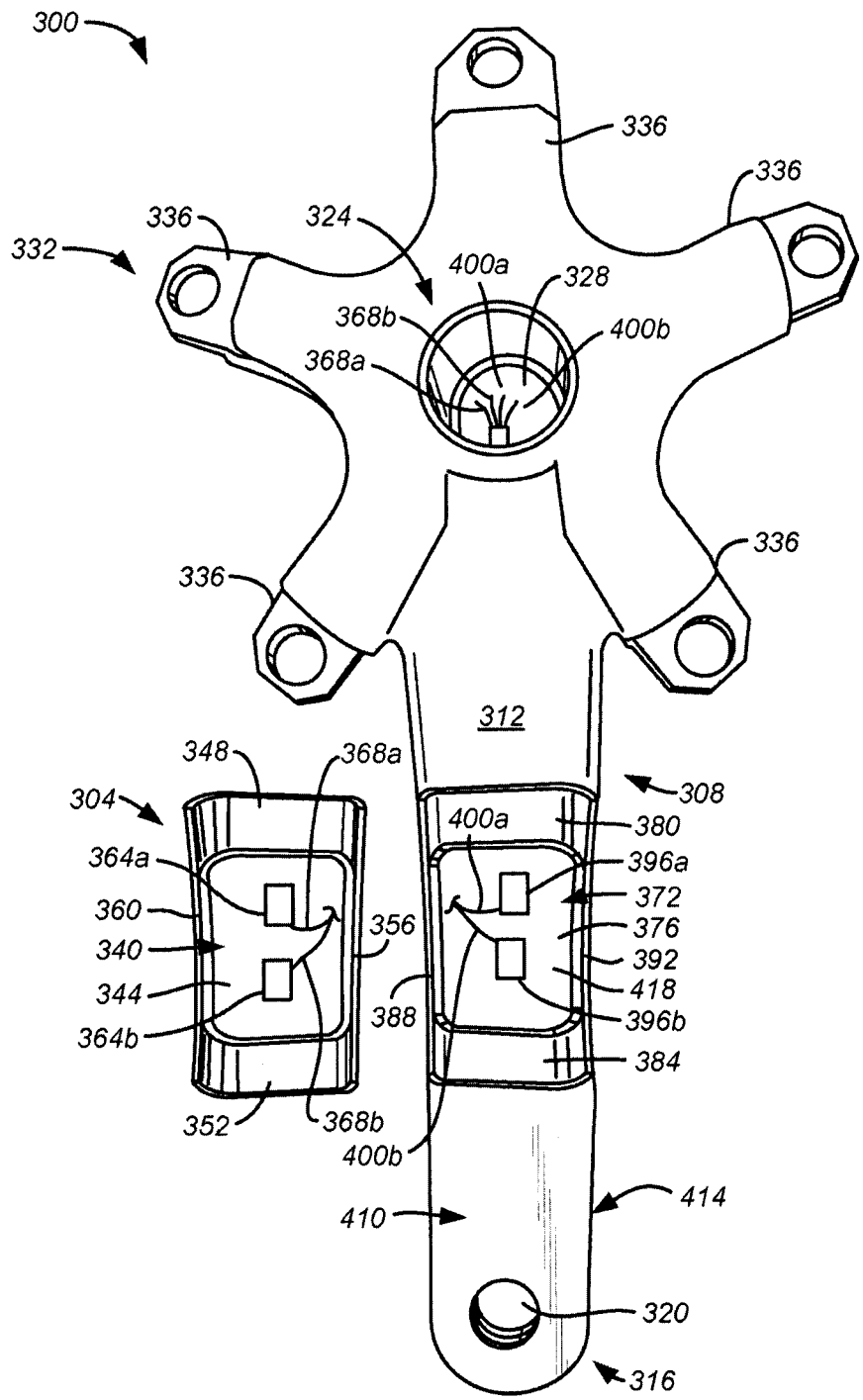
FIG. 12 is a partially exploded view of an alternative embodiment of a bicycle crank arm with attached sensors.

FIG. 12 is a partially exploded view of another embodiment of a bicycle crank arm 300. Crank arm 300 comprises a crank arm member 304 and a crank arm member 308, wherein crank arm member 304 is configured as a panel that is attached to an inner side frame attachment surface 312 of crank arm member 308. In other words, crank arm member 304 is configured to be an inner side portion of bicycle crank arm 300, and crank arm member 308 is configured to be both an outer side portion and an inner side portion of bicycle crank arm 300. In this embodiment, crank arm member 308 is configured as a substantially complete crank arm with a pedal attachment portion 316 including a pedal attachment opening 320, a crank axle attachment portion 324 including a crank axle attachment opening 328, and a sprocket attachment portion 332 including a plurality of (e.g., five) sprocket mounting arms 336 that extend radially outwardly from crank axle attachment portion 324.

Crank arm member 304 includes a substantially flat panel portion 340, a first laterally-curved coupling portion 348, a second laterally-curved coupling portion 352, a first longitudinal side wall in the form of a longitudinal sidewall coupling portion 356, and a second longitudinal side wall in the form of a second longitudinal sidewall coupling portion 360, all of which curve upwardly from the page in FIG. 12. Panel portion 340 includes a first sensor-mounting surface 344, wherein sensors 364a and 364b (e.g., strain gauges) are disposed on (e.g., bonded to) first sensor-mounting surface 344, and wire members 368a and 368b are electrically coupled to respective sensors 364a and 364b. If desired, panel portion 340 may have a curved surface.

Crank arm member 308 has a substantially flat panel portion 372 with a second sensor-mounting surface 376, a first laterally-curved coupling portion 380, a second laterally-curved coupling portion 384, a first longitudinal sidewall coupling portion 388 and a second longitudinal sidewall coupling portion 392, all of which curve downwardly from the page in FIG. 12. Sensors 396a and 396b (e.g., strain gauges) are disposed on (e.g., bonded to) second sensor-mounting surface 376, and wire members 400a and 400b are electrically coupled to respective sensors 396a and 396b. If desired, panel portion 372 may have a curved surface.

Figure 13:
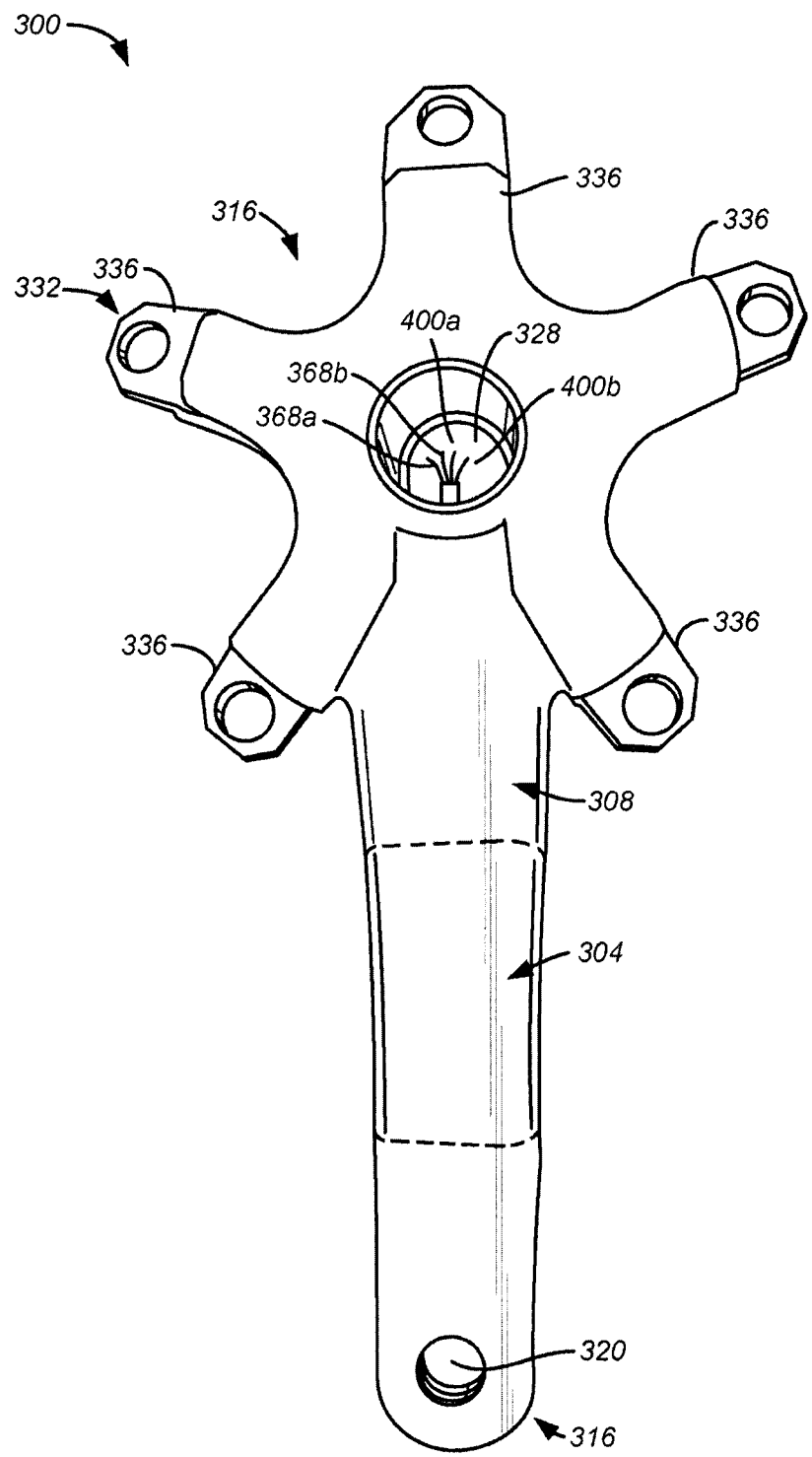
FIG. 13 is an inner side view of the bicycle crank arm of FIG. 12 in an assembled state.

In this embodiment, crank arm member 308 includes an inner space 418 such that crank arm member 304, sensors 364a, 364b and sensors 396a, 396b are disposed between pedal attachment portion 316 and crank axle attachment portion 324 when crank arm member 304 is bonded to or permanently attached to crank arm member 308 as shown in FIG. 13. At that time, crank arm member 304 is part of an inner side portion 410 of crank arm 300, crank arm member 308 is part of an outer side portion 414 of crank arm 300, first and second laterally-curved coupling portions 348 and 352 of crank arm member 304 overlap first and second laterally-curved coupling portions 380 and 384 of crank arm member 308, and first and second longitudinal sidewall coupling portions 356 and 360 of crank arm member 304 overlap first and second longitudinal sidewall coupling portions 388 and 392 of crank arm member 308. As a result, first sensor-mounting surface 344 faces second sensor-mounting surface 376 so that sensors 364a, 364b, 396a and 396b and wire members 368a, 368b, 400a and 400b are disposed within inner space 418. Wire members 368a, 368b, 400a and 400b extend through a passage (not shown) in crank arm 300 and exit crank arm 300 at crank axle mounting opening 328. In this embodiment, crank arm member 304 is bonded (e.g., fused) to crank arm member 308 so that the outer surface of crank arm member 304 is continuous with the outer surface of crank arm member 308 and the coupling of crank arm member 304 to crank arm member 308 is invisible. If desired, inner space 418 may extend substantially the entire length of second crank arm member 308. Furthermore, sensors 364a, 364b, 396a and 396b may comprise plural sensor elements, and wire members 368a, 368b, 400a and 400b may be formed by lexible printed wire.

Figure 14:
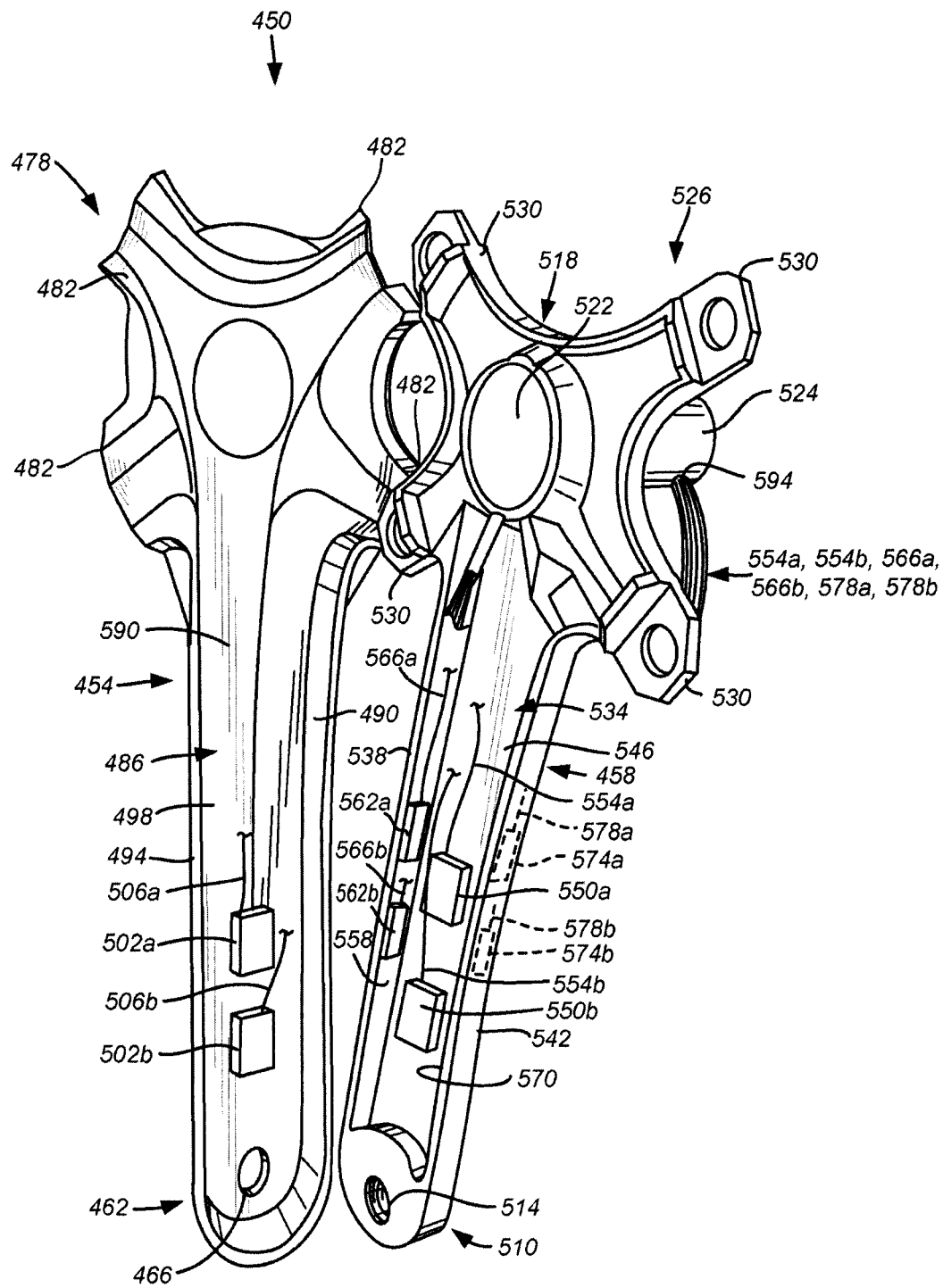
FIG. 14 is a partially exploded view of another embodiment of a bicycle crank arm with attached sensors.

FIG. 14 is a partially exploded view of another embodiment of a bicycle crank arm 450. Crank arm 450 comprises a panel-shaped crank arm member 454 and a panel-shaped crank arm member 458, wherein each crank arm member 454 and crank arm member 458 is configured as a longitudinal half of crank arm 450 so that crank arm member 454 is configured to be an outer side portion of bicycle crank arm 450, and crank arm member 458 is configured to be an inner side portion of bicycle crank arm 450. Crank arm member 454 includes a pedal attachment portion 462 and a sprocket attachment portion cover 478, wherein pedal attachment portion 462 includes a pedal attachment opening 466, and sprocket attachment portion cover 478 includes a plurality of (e.g., four) radially outwardly extending sprocket attachment arm covers 482. Crank arm member 454 further includes a substantially flat panel portion 486, a first longitudinal side wall in the form of a first longitudinal sidewall coupling portion 490, and a second longitudinal side wall in the form of a second longitudinal sidewall coupling portion 494. Panel portion 486 includes a first sensor mounting surface 498, wherein sensors 502a and 502b (e.g., strain gauges) are disposed on (e.g., bonded to) first sensor-mounting surface 498 between pedal attachment portion 462 and sprocket attachment portion cover 478, and wire members 506a and 506b are electrically coupled to respective sensors 498a and 498b. If desired, panel portion 486 may have a curved surface.

Crank arm member 458 includes a pedal attachment portion 510 with a pedal attachment opening 514, a crank axle attachment portion 518 with a crank axle opening 522, and a sprocket attachment portion 526 with a plurality of (e.g., four) sprocket mounting arms 530 that extend radially outwardly from crank axle attachment portion 518. A hollow crank axle 524 is attached to crank axle attachment portion 518. Crank arm member 458 also includes a substantially flat panel portion 534, a first longitudinal side wall in the form of a first longitudinal sidewall coupling portion 538, and a second longitudinal side wall in the form of a second longitudinal sidewall coupling portion 542. Panel portion 534 includes a second sensor mounting surface 546, wherein sensors 550a and 550b (e.g., strain gauges) are disposed on (e.g., bonded to) second sensor-mounting surface 546 between pedal attachment portion 510 and crank axle attachment portion 518, and wire members 554a and 554b are electrically coupled to respective sensors 550a and 550b. First longitudinal sidewall coupling portion 538 includes a third sensor mounting surface 558, wherein sensors 562a and 562b (e.g., strain gauges) are disposed on (e.g., bonded to) third sensor-mounting surface 558 between pedal attachment portion 510 and crank axle attachment portion 518, and wire members 566a and 566b are electrically coupled to respective sensors 562a and 562b. Second longitudinal sidewall coupling portion 542 includes a fourth sensor mounting surface 570, wherein sensors 574a and 574b (e.g., strain gauges) are disposed on (e.g., bonded to) fourth sensor-mounting surface 570 between pedal attachment portion 510 and crank axle attachment portion 518, and wire members 578a and 578b are electrically coupled to respective sensors 574a and 574b. If desired, panel portion 534 may have a curved surface.

Figure 15:
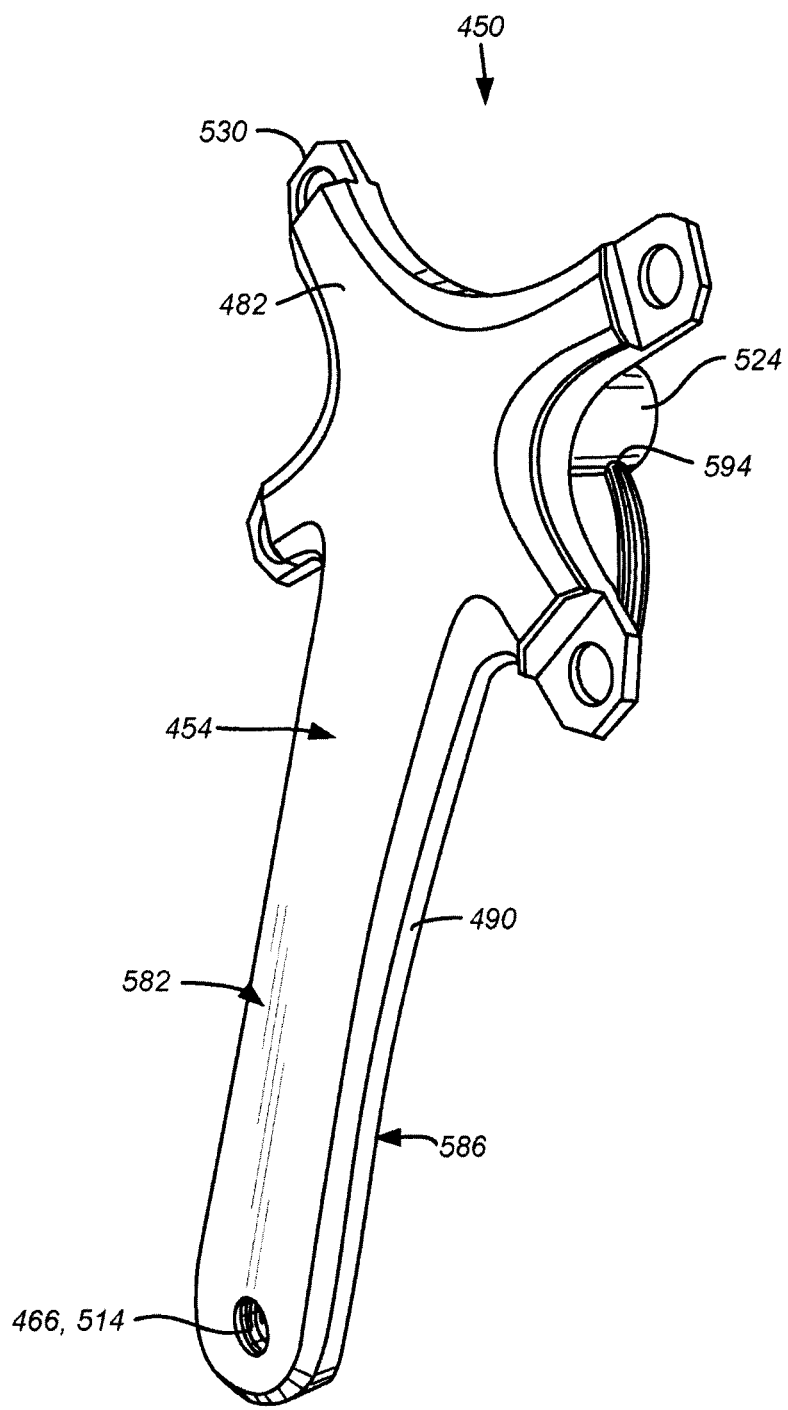
FIG. 15 is an inner side view of the bicycle crank arm of FIG. 14 in an assembled state.

In this embodiment, crank arm 450 is hollow along substantially its entire length. When crank arm member 454 is bonded to or permanently attached to crank arm member 458 as shown in FIG. 15, crank arm member 454 is part of an outer side portion 582 of crank arm 450, crank arm member 458 is part of an inner side portion 586 of crank arm 450, first and second longitudinal sidewall coupling portions 490 and 494 of crank arm member 454 overlap the corresponding first and second longitudinal sidewall coupling portions 538 and 542 of crank arm member 458, and sprocket attachment arm covers 482 cover radially inner portions of their respective sprocket attachment arms 530. At that time, first sensor-mounting surface 498 faces second sensor-mounting surface 546 to form an inner space 590 such that sensors 502a, 502b, 550a, 550b, 562a, 562b, 574a and 574b and wire members 506a, 506b, 554a, 554b, 566a, 566b, 578a and 578b are disposed in inner space 590. Wire members 506a, 506b, 554a, 554b, 566a, 566b, 578a and 578b extend through inner space 590 and exit crank arm 450 through an opening 594 in crank axle 524. If desired, sensors 502a, 502b, 550a, 550b, 562a, 562b, 574a and 574b may comprise plural sensor elements, and wire members 506a, 506b, 554a, 554b, 566a, 566b, 578a and 578b may be formed by flexible printed wire.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle crank arm comprising:
   a first crank arm member having a first sensor-mounting surface;
   a first sensor mounted to the first sensor-mounting surface;
   a second crank arm member having a second sensor-mounting surface;
   wherein the first sensor-mounting surface and the second sensor-mounting surface are part of the same bicycle crank arm; and
   a second sensor mounted to the second sensor-mounting surface.

2. The bicycle crank arm according to claim 1 wherein the crank arm is hollow along its entire length.

3. The bicycle crank arm according to claim 1 wherein the first sensor-mounting surface faces the second sensor-mounting surface.

4. The bicycle crank arm according to claim 1 wherein the first crank arm member and the second crank arm member are bonded together.

5. The bicycle crank arm according to claim 1 wherein the first crank arm member and the second crank arm member are permanently attached together.

6. The bicycle crank arm according to claim 1 wherein one of the first crank arm member and the second crank arm member is configured as a panel that is attached to the other of the first crank arm member and the second crank arm member.

7. The bicycle crank arm according to claim 6 wherein the panel is disposed on an inner side frame attachment surface of the crank arm.

8. The bicycle crank arm according to claim 1 wherein the bicycle crank arm has a crank axle attachment portion and a pedal attachment portion, and wherein at least either the first sensor or the second sensor is disposed between the crank axle attachment portion and pedal attachment portion.

9. The bicycle crank arm according to claim 1 wherein the first crank arm member is configured as a longitudinal half of the crank arm.

10. The bicycle crank arm according to claim 1 wherein the first crank arm member is configured to be an inner side portion of the bicycle crank arm, and wherein the second crank arm member is configured to be an outer side portion of the bicycle crank arm.

11. The bicycle crank arm according to claim 1 wherein the first crank arm member has a longitudinal side wall, and wherein the second crank arm member has a longitudinal second side wall that overlaps the longitudinal side wall of the first crank arm member.

12. The bicycle crank arm according to claim 11 wherein the second crank arm member has a sprocket attachment portion.

13. The bicycle crank arm according to claim 1 wherein the bicycle crank arm has an inner space, and wherein the first sensor and the second sensor are disposed in the inner space.

14. The bicycle crank arm according to claim 13 wherein the bicycle crank arm includes an inner side portion, an outer side portion, a first coupling portion which couples the inner side portion and the outer side portion, and a second coupling portion which is separate from the first coupling portion and which couples the inner side portion and the outer side portion;
wherein the first sensor-mounting surface is on one of the inner side portion and the outer side portion; and
wherein the second sensor-mounting surface is on the other of the inner side portion and the outer side portion.

15. The bicycle crank arm according to claim 14 wherein the first coupling portion has a third sensor-mounting surface, wherein the second coupling portion has a fourth sensor-mounting surface, and further comprising:
a third sensor mounted to the third sensor-mounting surface; and
a fourth sensor mounted to the fourth sensor-mounting surface.

16. The bicycle crank arm according to claim 15 wherein the third sensor-mounting surface and the fourth sensor-mounting surface are disposed on one of the first crank arm member or the second crank arm member.

17. The bicycle crank arm according to claim 13 further comprising:
a first electrical wire member coupled to the first sensor; and
a second electrical wire member coupled to the second sensor;
wherein the first electrical wire member and the second electrical wire member are disposed in the inner space.

18. The bicycle crank arm according to claim 17 wherein the first electrical wire member and the second electrical wire member are connected to a circuit board which is disposed inside of the crank arm.

19. The bicycle crank arm according to claim 17 wherein the first electrical wire member and the second electrical wire member are connected to a circuit board which is disposed outside of the crank arm.

20. The bicycle crank arm according to claim 19 wherein the circuit board includes a wireless transmitter.

21. The bicycle crank arm according to claim 20 wherein a box is disposed on the inner side surface of the crank arm, and wherein the circuit board is disposed in the box.

22. The bicycle crank arm according to claim 21 further comprising a battery disposed in the box.

* * * * *